United States Patent
Shlyakhov et al.

(10) Patent No.: US 11,122,264 B2
(45) Date of Patent: Sep. 14, 2021

(54) ADAPTIVE LOOP FILTER (ALF) COEFFICIENTS IN VIDEO CODING

(71) Applicant: QUALCOMM Incorporated, San Diego, CA (US)

(72) Inventors: Nikolay Mikhaylovich Shlyakhov, San Diego, CA (US); Dmytro Rusanovskyy, San Diego, CA (US); Vadim Seregin, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/704,700

(22) Filed: Dec. 5, 2019

(65) Prior Publication Data
US 2020/0186798 A1    Jun. 11, 2020

Related U.S. Application Data

(60) Provisional application No. 62/776,376, filed on Dec. 6, 2018.

(51) Int. Cl.
| H04N 19/117 | (2014.01) |
| H04N 19/174 | (2014.01) |
| H04N 19/176 | (2014.01) |
| H04N 19/159 | (2014.01) |

(52) U.S. Cl.
CPC ......... *H04N 19/117* (2014.11); *H04N 19/159* (2014.11); *H04N 19/174* (2014.11); *H04N 19/176* (2014.11)

(58) Field of Classification Search
CPC .. H04N 19/117; H04N 19/159; H04N 19/174; H04N 19/176; H04N 19/463; H04N 19/70
See application file for complete search history.

(56) References Cited

U.S. PATENT DOCUMENTS

| 2011/0274158 A1* | 11/2011 | Fu ...................... H04N 19/129 375/240.02 |
| 2013/0156097 A1* | 6/2013 | Budagavi ............ H04N 19/82 375/240.02 |
| 2017/0332075 A1* | 11/2017 | Karczewicz ........ H04N 19/107 |

OTHER PUBLICATIONS

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.

(Continued)

*Primary Examiner* — Farzana Hossain
(74) *Attorney, Agent, or Firm* — Shumaker & Sieffert, P.A.

(57) ABSTRACT

Techniques are described for temporal prediction for adaptive loop filter (ALF) in video coding. A video coder may determine that temporal prediction for ALF is enabled for one or more intra coded slices of a picture, determine ALF coefficients for one or more blocks of the one or more intra coded slices, for which the temporal prediction for ALF is enabled, based on ALF coefficients of a previously coded picture or slice, and apply the determined ALF coefficients to the one or more blocks to generate one or more filtered blocks.

27 Claims, 7 Drawing Sheets

(56) References Cited

OTHER PUBLICATIONS

Bross B., et al., "High Efficiency Video Coding (HEVC) text specification draft 10 (for FDIS & Consent)," Joint Collaborative Team on Video Coding (JCT-VC) of ITU-T SG 16 WP 3 and ISO/IEC JTC 1/SC 29/WG 11, Document: JCTVC-L1003_v34, 12th Meeting: Geneva, CH, Jan. 14-23, 2013, 310 pages.
Bross B., et al., "Versatile Video Coding (Draft 7)", Joint Video Experts Team (JVET) of ITU-T SG 16 WP 3 and ISO/IEC JTC 1/SC 29/WG 11, JVET-P2001-v9, 16th Meeting: Geneva, CH, Oct. 1-11, 2019, 490 pages.
Chen J., et al., "Algorithm Description of Joint Exploration Test Model 1," 1, JVET Meeting; Oct. 19, 2015-Oct. 21, 2015; Geneva;(The Joint Video Exploration Team of ISO/IEC JTC1/SC29/WG11 and ITU-T SG.16 ); URL: http://phenix.int-evry.fr/jvet/,, No. JVET-A1001 Feb. 24, 2016 (Feb. 24, 2016), XP030150000, 27 pages.
Ergen S., "ZigBee/IEEE 802.15.4 Summary", Sep. 10, 2004, 37 Pages.
IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.
ITU-T H.265, "Series H: Audiovisual and Multimedia Systems, Infrastructure of audiovisual services—Coding of moving video, High efficiency video coding," The International Telecommunication Union. Dec. 2016, 664 Pages.
Karczewicz M., et al., "EE2.5: Improvements on Adaptive Loop Filter," Joint Video Exploration Team (JVET) of ITU-T SG 16 WP 3 and ISO/IEC JTC 1/SC 29/WG 11, Document: JVET-C0038, 3rd Meeting: Geneva, CH, , May 26-Jun. 1, 2016, 4 pages.
Karczewicz M., et al., "Geometry Transformation-based Adaptive In-Loop Filter," Picture Coding Symposium, IEEE, Dec. 4-7, 2016, pp. 1-5, XP033086856, DOI: 10.1109/PCS.2016.7906346, [retrieved on Apr. 19, 2017], Section III.
Karczewicz M., et al., "Improvements on Adaptive Loop Filter," Joint Video Exploration Team (JVET) of ITU-T SG 16 WP 3 and ISO/IEC JTC 1/SC 29/WG 11, Document: JVET-B0060, 2nd Meeting: San Diego, USA, Feb. 20-26, 2016, 5 pages.
Tsai C-Y., et al., "Adaptive Loop Filtering for Video Coding," IEEE Journal of Selected Topics in Signal Processing, vol. 7 (6), Dec. 1, 2013, pp. 934-945, XP055265962, US ISSN: 1932-4553, DOI: 10.1109/JSTSP.2013.2271974, the whole document.
Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.

* cited by examiner

ADAPTIVE LOOP FILTER (ALF) COEFFICIENTS IN VIDEO CODING

This application claims the benefit of U.S. Provisional Application No. 62/776,376, filed Dec. 6, 2018, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for filtering which could be used in a post-processing stage, for in-loop coding, and/or in the prediction stage for a video coding process. The techniques of this disclosure may be applied to any of the existing video codecs, such as HEVC (High Efficiency Video Coding) or be an efficient coding tool in any future video coding standards such as versatile video coding (VVC). This disclosure describes example techniques of signaling and usage of adaptive loop filter (ALF) coefficients (also referred to as ALF filter entity or ALF filter coefficients) in video coding.

In some examples, ALF coefficients used when filtering a previous block may be used as predictors for the ALF coefficients used when filtering a current block, including instances where the current block is intra coded. The previous block may be a block in a previously coded picture or may be a block in a previously coded slice in the same picture as the current block. The prediction of ALF coefficients for a current block based on ALF coefficients of a previous block is referred to as temporal prediction for ALF. This disclosure describes example practical applications to utilize temporal prediction for ALF to reduce the amount of information that needs to be signaled.

In one example, the disclosure describes a method of coding video data, the method comprising determining that temporal prediction for adaptive loop filter (ALF) is enabled for one or more intra coded slices of a picture, determining ALF coefficients for one or more blocks of the one or more intra coded slices, for which the temporal prediction for ALF is enabled, based on ALF coefficients of a previously coded picture or slice, and applying the determined ALF coefficients to the one or more blocks to generate one or more filtered blocks.

In one example, the disclosure describes a device for coding video data, the device comprising memory configured to store ALF coefficients of a previously coded picture or slice and processing circuitry coupled to the memory. The processing circuitry is configured to determine that temporal prediction for adaptive loop filter (ALF) is enabled for one or more intra coded slices of a picture, determine ALF coefficients for one or more blocks of the one or more intra coded slices, for which the temporal prediction for ALF is enabled, based on the ALF coefficients of the previously coded picture or slice stored in memory, and apply the determined ALF coefficients to the one or more blocks to generate one or more filtered blocks.

In one example, the disclosure describes a computer-readable storage medium having instructions stored thereon that when executed cause one or more processors of a device for coding video data to determine that temporal prediction for adaptive loop filter (ALF) is enabled for one or more intra coded slices of a picture, determine ALF coefficients for one or more blocks of the one or more intra coded slices, for which the temporal prediction for ALF is enabled, based on ALF coefficients of a previously coded picture or slice, and apply the determined ALF coefficients to the one or more blocks to generate one or more filtered blocks.

In one example, the disclosure describes a device for coding video data, the device comprising means for determining that temporal prediction for adaptive loop filter (ALF) is enabled for one or more intra coded slices of a picture, means for determining ALF coefficients for one or more blocks of the one or more intra coded slices, for which the temporal prediction for ALF is enabled, based on ALF coefficients of a previously coded picture or slice, and means for applying the determined ALF coefficients to the one or more blocks to generate one or more filtered blocks.

The details of one or more examples are set forth in the accompanying drawings and the description below. Other features, objects, and advantages will be apparent from the description, drawings, and claims.

DETAILED DESCRIPTION

Figure 1:
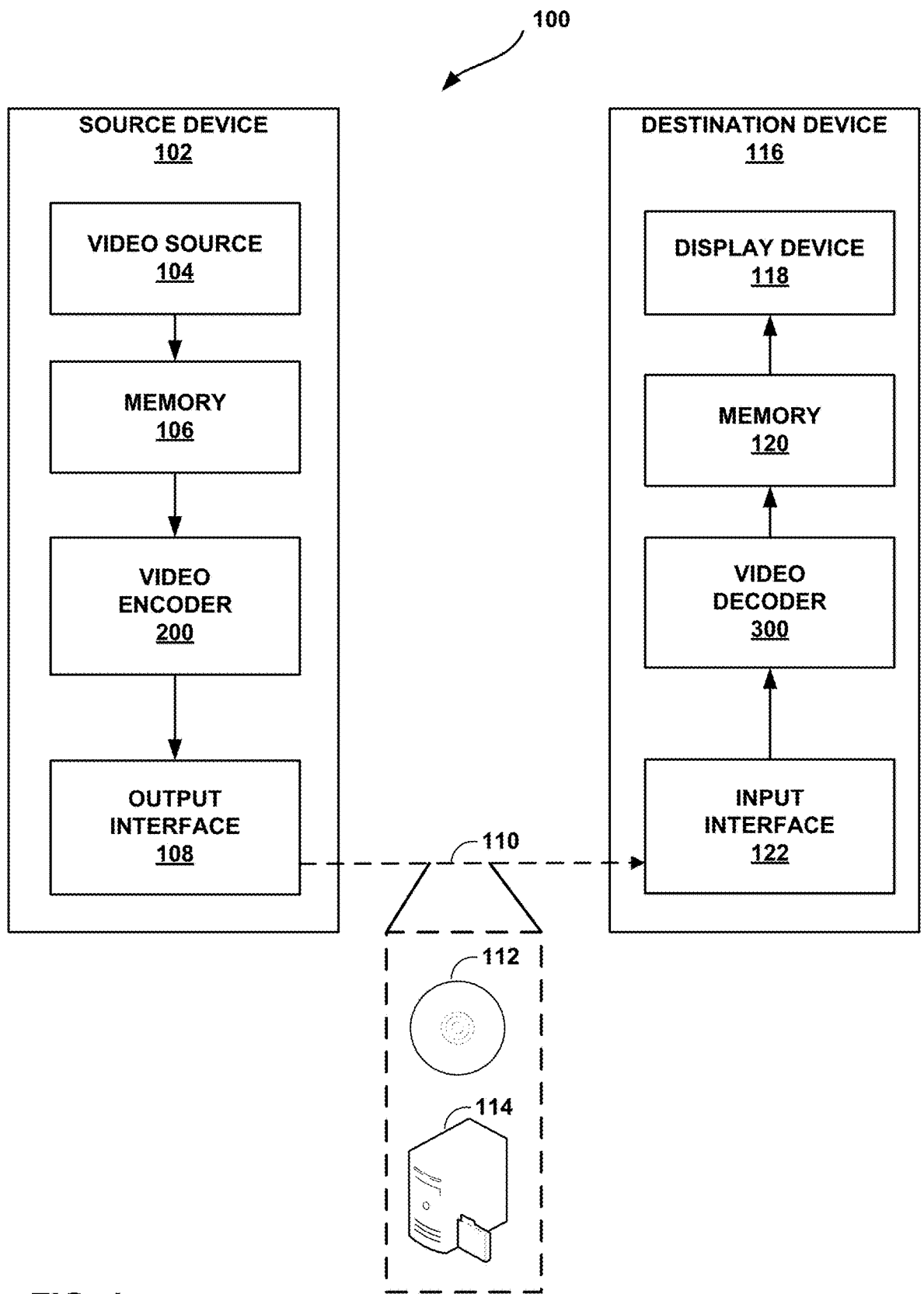
FIG. 1 is a block diagram illustrating an example video encoding and decoding system that may perform the techniques of this disclosure.

In video coding, a video decoder may reconstruct a current block by adding a prediction block and signaled residual information. To improve quality, the video decoder may apply an adaptive loop filter (ALF) to filter the reconstructed block and generate a filtered block. In some examples, the filtered block may be used as a reference block for decoding a subsequent block. In such cases, the adaptive loop filtering may be referred to as in-loop filtering. For in-loop filtering, a video encoder may similarly apply adaptive loop filtering to a reconstructed block so that the reference block used by the video encoder for encoding a subsequent block is the same as the reference block used by the video decoder for decoding the subsequent block. In some examples, the filtered block may not be used as a reference block for decoding the subsequent block. Rather, the unfiltered, reconstructed block may be used as the reference block. In such cases, the adaptive loop filtering may be referred to as post-filtering.

One example way in which to perform ALF is for the video encoder to signal ALF coefficients to the video decoder. As one example, the video encoder may determine the ALF coefficients as follows h(k, 1), k=−K, . . . , K, 1, and may quantize the ALF coefficients according to f(k,l)=round (normFactor*h(k,l)). The video decoder may apply filter coefficients f(k, 1) to a reconstructed block R(i, j) as follows:

$$\tilde{R}(i,j) = \sum_{k=-K}^{K}\sum_{l=-K}^{K} f(k,l)R(i+k,j+l) / \sum_{k=-K}^{K}\sum_{l=-K}^{K} f(k,l),$$

where i and j are the coordinates of the pixels within the block.

Signaling of the ALF coefficients may require additional bandwidth. Accordingly, to reduce the amount of data that needs signaling, ALF coefficients for a picture, slice of the picture, or block of the picture may be predicted from ALF coefficients of a previous picture, slice, or block. For example, rather than signaling ALF coefficients for a current block, slice, or picture, the video encoder may signal an index that identifies a previous picture, slice, or block. The video decoder may utilize the ALF coefficients for the previous picture, slice, or block to determine the ALF coefficients for the current block, slice, or picture. The ALF coefficients for the previous picture, slice, or block may be referred to as ALF coefficient predictors. The prediction of ALF coefficients for a current block based on ALF coefficients of a previous block is referred to as temporal prediction for ALF.

In some techniques, ALF related syntax information is coded in a slice header. Since blocks in inter coded (e.g., inter-predicted) slices are coded with respect to blocks in different pictures, temporal prediction for ALF may have only be enabled for inter coded slices or blocks. In such cases, for intra coded (e.g., intra-predicted) slices, the video encoder may have needed to signal the ALF coefficients, thereby increasing the amount of information that is signaled.

This disclosure describes example techniques for enabling temporal prediction for ALF for intra coded pictures or slices. For instance, a video coder (e.g., the video encoder and the video decoder) may determine, for a picture having one or more intra coded slices, that temporal prediction for ALF is enabled (e.g., based on syntax elements or flag(s) signaled in the bitstream) for one or more of the one or more intra coded slices. The video coder may determine ALF coefficients for one or more blocks of the one or more of the one or more intra coded slices based on ALF coefficients of a previously coded picture or slice and apply the determined ALF coefficients to the one or more blocks to generate one or more filtered blocks.

However, enabling temporal prediction for ALF for all intra coded slices may result in coding issues. As one example, in hierarchical coding schemes, there are a plurality of layers identified by temporal index values. In hierarchical coding schemes, based on bandwidth availability or processing capabilities of the video decoder, layers having higher temporal index values may be dropped in the bitstream. For instance, the plurality of layers may include a base layer (e.g., with temporal index value of 0) and one or more enhancement layers (e.g., each with temporal index values greater than 0). The base layer should be completely decodable without needing information from any of the other layers. That is, for a base level of image quality, the video decoder may not need to decode any other layers other than the pictures in the base layer.

For enhanced image quality, the video decoder may decode a first enhancement layer (e.g., with temporal index value of 1) and the base layer, for further enhanced image quality, the video decoder may decode a second enhancement layer (e.g., with temporal index value of 2) and the first enhancement layer and the base layer, and so forth. The above is one example of a hierarchical coding scheme, and the example techniques should not be considered limited to the above example.

Pictures in layers having lower temporal index values cannot use pictures in layers having higher temporal index values as reference pictures because the pictures in the layers having the higher temporal index values may be dropped from the bitstream including information used to perform ALF on those pictures. In some examples, to ensure that pictures in base layer do not need ALF coefficients from pictures in layers having a higher temporal index value, temporal prediction of ALF may be disabled for pictures having a temporal index value of 0. For instance, in the above example, where temporal prediction for ALF is enabled for the picture having one or more intra coded slices, the temporal index value for the picture may be not equal to 0 (e.g., greater than 0).

Moreover, in some examples, the video encoder may intersperse, in the bitstream, certain intra coded pictures that do not need information from a previous picture for decoding. Interspersing such intra coded pictures limits propagation of errors due to picture dropping and allows for video skipping. For example, due to a transmission error, there is a possibility that a picture is dropped from the bitstream. If this dropped picture was used as a reference picture for a subsequent picture, then there may be errors in decoding the subsequent picture, and if the subsequent picture is a reference picture for a following subsequent picture, then there may be errors in decoding the following subsequent picture, and so forth. By including intra coded pictures that do not need information from previous pictures for decoding, the error from dropping a picture may be mitigated.

Also, because these intra coded pictures do not require information from previous pictures for decoding, interspersing these intra coded pictures allows for picture to which a viewer can skip and start viewing the video from that picture. For instance, a viewer can skip forward in the video to an intra coded picture that does not require information from previous pictures for decoding, and the video decoder can being to decode from that picture without needing information from any of the pictures that were skipped, and therefore, unavailable.

If temporal prediction of ALF were enabled for these intra coded pictures that do not require information from previous pictures of decoding, there may be possibility that applying ALF to these intra coded pictures requires ALF coefficients from a previous picture, which may not be available. This may result in situations where the quality of the adaptive loop filtering is negatively impacted.

In one or more examples, the video coder may determine that temporal prediction of ALF is not enabled for intra coded pictures for that do not require information from previous pictures for decoding. Examples of types of such intra coded pictures are intra random access picture (IRAP), random access picture (RAP), instantaneous decoder refresh (IDR), or clean random access (CRA) types. For instance, in the above example, where temporal prediction for ALF is enabled for the picture having one or more intra coded slices, the picture may not be a picture of one of the following types: IRAP, RAP, IDR, or CRA types.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for signaling and usage of adaptive loop filter (ALF) coefficients. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for signaling and using of ALF coefficients. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may include one or both of a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may include an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 7)," Joint Video Experts Team (WET) of ITU-T SG 16 WP 3 and ISO/IEC JTC 1/SC 29/WG 11, 16$^{th}$ Meeting: Geneva, CH, 1-11 Oct. 2019, JVET-P2001-v9 (hereinafter "VVC Draft 7"). As another example, video encoder 200 and video decoder 300 may operate according to the Essential Video Coding (EVC) standard currently under development. The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of CTUs. Video encoder 200 may partition a CTU according to a tree structure, such as a quadtree-binary tree (QTBT) structure. The QTBT structure of JEM removes the concepts of multiple partition types, such as the separation between CUs, PUs, and TUs of HEVC. However, in some cases, a TU may be partitioned differently than a CU. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

Video encoder 200 and video decoder 300 may be configured to use quadtree partitioning per HEVC, QTBT partitioning according to JEM or VVC, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

JEM or VVC also provides an affine motion compensation mode, which may be considered as an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. JEM or VVC provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

As described in more detail, in some examples, video encoder 200 and video decoder 300 may be configured to filter one or more blocks (e.g., reconstructed blocks) using adaptive loop filtering (ALF). This disclosure describes examples for determining ALF coefficients used for ALF, such as determining ALF coefficients based on ALF coefficients of a previously coded picture or slice. Determining ALF coefficients based on ALF coefficients of a previously coded picture or slice is referred to as temporal prediction for ALF.

In accordance with techniques described in this disclosure, temporal prediction for ALF may be enabled for intra coded slices. For example, a video coder (e.g., video encoder 200 or video decoder 300) may determine that temporal prediction for adaptive loop filter (ALF) is enabled for one or more intra coded slices of a picture, determine ALF coefficients for one or more blocks of the one or more intra coded slices, for which the temporal prediction for ALF is enabled, based on the ALF coefficients of the previously coded picture or slice stored, and apply the determined ALF coefficients to the one or more blocks to generate one or more filtered blocks.

The following reiterates some of the above information for video coding standards. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. In addition, a video coding standard, namely High Efficiency Video Coding (HEVC) or ITU-T H.265, including its range extension, multiview extension (MV-HEVC) and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

The latest HEVC draft specification, and referred to as HEVC WD hereinafter, is available from http://phenix.int-evry.fr/jct/doc_end_user/documents/14_Vienna/wg11/JCTVC-N1003-v1.zip. A version of HEVC is available from JCTVC-L1003_v34, http://phenix.it-sudparis.eu/jct/doc_en-d_user/documents/12_Geneva/wg11/JCTVC-L1003-v34.zip. The latest draft of the H.265 specification is: ITU-T H.265, Series H: Audiovisual and Multimedia Systems, Infrastructure of audiovisual services—Coding of moving video, Advanced video coding for generic audiovisual services, The International Telecommunication Union. December 2016, and herein referred to as H.265 or HEVC.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. A version of reference software, i.e., Joint Exploration Model 7 (JEM 7) could be downloaded from: https://jvet.hhi.fraunhofer.de/svn/svn_HMJEMSoftware/tags/HM-16.6-JEM-7.0/. The next video coding standard is referred to as versatile video coding (VVC) or H.266.

The following describes Adaptive Loop Filter (ALF) in JEM. In addition to the modified DB (deblock) and HEVC SAO (sample adaptive offset) filtering methods, JEM includes another filtering method, called Adaptive Loop Filtering (ALF). Additional information about ALF can be found from: Tsai, C. Y., Chen, C. Y., Yamakage, T., Chong, I. S., Huang, Y. W., Fu, C. M., Itoh, T., Watanabe, T., Chujoh, T., Karczewicz, M. and Lei, S. M., "Adaptive loop filtering for video coding", *IEEE Journal of Selected Topics in Signal Processing*, 7(6), pp. 934-945, 2013, and M. Karczewicz, L. Zhang, W.-J. Chien, and X. Li, "Geometry transformation-based adaptive in-loop filter", Picture Coding Symposium (PCS), 2016.

ALF techniques may be used to minimize the mean square error between original pixels and decoded pixels, such as by using Wiener-based adaptive filter coefficients (as one non-limiting example). For instance, video encoder 200 may encode video data for a block that video decoder 300 decodes to reconstruct the block. However, due to some losses in the encoding/decoding process, the reconstructed block (e.g., decoded pixels) and the block that video encoder 200 encoded (e.g., original pixels) may not be the same. ALF techniques may be utilized by video decoder 300 to minimize the errors between the reconstructed block and the original block.

Video encoder 200 may be configured to signal ALF coefficients (e.g., Wiener-based adaptive filter coefficients) to video decoder 300 so that video decoder 300 can apply the ALF techniques. In some examples, to determine what the error may be between the original block and the reconstructed block (e.g., original pixels and decoded pixels), video encoder 200 may include a decoding process so that video encoder 200 performs similar operations that video decoder 300 will perform. In other words, by performing the same or similar decoding process that video decoder 300 performs, video encoder 200 may be able to determine what the error between the reconstructed block and the original block will be when video decoder 300 performs the reconstruction process. Video encoder 200 may determine the ALF coefficients based on the differences between the reconstructed block and the original block.

In some examples, video encoder 200 and video decoder 300 may pre-store a plurality of sets of ALF coefficients, referred to as basis filters. Video encoder 200 may signal and video decoder 300 may receive updates to one of the pre-stored sets of ALF coefficients based on the ALF coefficients that video encoder 200 determined. Video decoder 300 may update the ALF coefficients and utilize the updated ALF coefficients. In some examples, rather than signaling updates to the basis filter, video encoder 200 may signal the ALF coefficients that video decoder 300 receives.

One example implementation of the ALF assumes that coefficients of ALF or update to basis filters are signaled at the slice header, and that ALF signaling and usage is controlled by flags signaled at the SPS and slice level, as is shown in the example specification text below.

Sequence Parameter Set Syntax

| seq_parameter_set_rbsp( ) { | Descriptor |
|---|---|
| sps_seq_parameter_set_id | ue(v) |
| ... | |
| sps_alf_enabled_flag | u(1) |
| ... | |
| } | |

Slice Header Syntax

| slice_header( ) { | Descriptor |
|---|---|
|   slice_pic_parameter_set_id | ue(v) |
|   ... | |
|   if( sps_alf_enabled_flag ) { | |
|     slice_alf_enabled_flag | u(1) |
|     if( slice_alf_enabled_flag ) | |
|       alf_data( ) | |
|   } | |
|   ... | |
| } | |

Adaptive Loop Filter Data Syntax

| alf_data( ) { | Descriptor |
|---|---|
|   alf_chroma_idc | tu(v) |
|   alf_luma_num_filters_signalled_minus1 | tb(v) |
|   if( alf_luma_num_filters_signalled_minus1 > 0 ) { | |
|     for( filtIdx = 0; filtIdx < NumAlfFilters; filtIdx++ ) | |
|       alf_luma_coeff_delta_idx[ filtIdx ] | tb(v) |
|   } | |
|   alf_luma_coeff_delta_flag | u(1) |
|   if ( !alf_luma_coeff_delta_flag && alf_luma_num_filters_signalled_minus1 > 0 ) | |
|     alf_luma_coeff_delta_prediction_flag | u(1) |
|   alf_luma_min_eg_order_minus1 | ue(v) |
|   for( i = 0; i < 3; i++ ) | |
|     alf_luma_eg_order_increase_flag[ i ] | u(1) |
|   if ( alf_luma_coeff_delta_flag ) { | |
|     for( sigFiltIdx = 0; sigFiltIdx <= alf_luma_num_filters_signalled_minus1; sigFiltIdx++ ) | |
|       alf_luma_coeff_flag[ sigFiltIdx ] | u(1) |
|   } | |
|   for( sigFiltIdx = 0; sigFiltIdx <= alf_luma_num_filters_signalled_minus1; sigFiltIdx++ ) { | |
|     if ( alf_luma_coeff_flag[ sigFiltIdx ] ) { | |
|       for ( j = 0; j < 12; j++ ) { | |
|         alf_luma_coeff_delta_abs[ sigFiltIdx ][ j ] | uek(v) |
|         if( alf_luma_coeff_delta_abs[ sigFiltIdx ][ j ] ) | |
|           alf_luma_coeff_delta_sign[ sigFiltIdx ][ j ] | u(1) |
|       } | |
|     } | |
|   } | |
|   if ( alf_chroma_idc > 0 ) { | |
|     alf_chroma_min_eg_order_minus1 | ue(v) |
|     for( i = 0; i < 2; i++ ) | |
|       alf_chroma_eg_order_increase_flag[ i ] | u(1) |
|     for( j = 0; j < 6; j++ ) { | |
|       alf_chroma_coeff_abs[ j ] | uek(v) |
|       if( alf_chroma_coeff_abs[ j ] > 0 ) | |
|         alf_chroma_coeff_sign[ j ] | u(1) |
|     } | |
|   } | |
| } | |

One technique for improvement of ALF is temporal prediction of ALF coefficients or re-usage of previously-signaled ALF entities (e.g., parameter and coefficients). Temporal prediction of ALF coefficients or re-usage of previously signaled ALF entities may include the following: filters (e.g., coefficients) derived for previously coded frames, which may be stored in a buffer. If a current slice is of a P or B frame (e.g., the blocks of the slice are inter coded), then one of the stored set of filters may be used to filter frame. This avoids the coding of filters in some cases for P and/or B frames. For instance, rather than signaling ALF coefficients for blocks of an inter coded (e.g., inter-predicted) slice, video encoder 200 may signal information indicative of a previously coded picture, and video decoder 300 may utilize the ALF coefficients for the previously coded picture. In this example, the previous ALF coefficients form as a predictor for the ALF coefficient used for blocks of the inter coded slice. Temporal prediction for ALF refers to ALF coefficients for a block being predicted from previous ALF coefficients. However, in some of these techniques, temporal prediction for ALF may have been limited to inter coded slices (e.g., inter-predicted blocks) and may not have been used for intra coded slices (e.g., intra-predicted blocks).

For example, an additional flag and index may be coded for the ALF syntax for temporal prediction as follows:

```
if (slice_type != I){
   alf_temporal_flag
```

-continued

```
if (alf_temporal_flag) {
   alf_temporal_index
}
```

As can be seen from the above pseudo-code, alf_temporal_flag, which is indicative of whether temporal prediction for ALF is enabled, may only be signaled if slice type is not intra coded.

Figure 5:
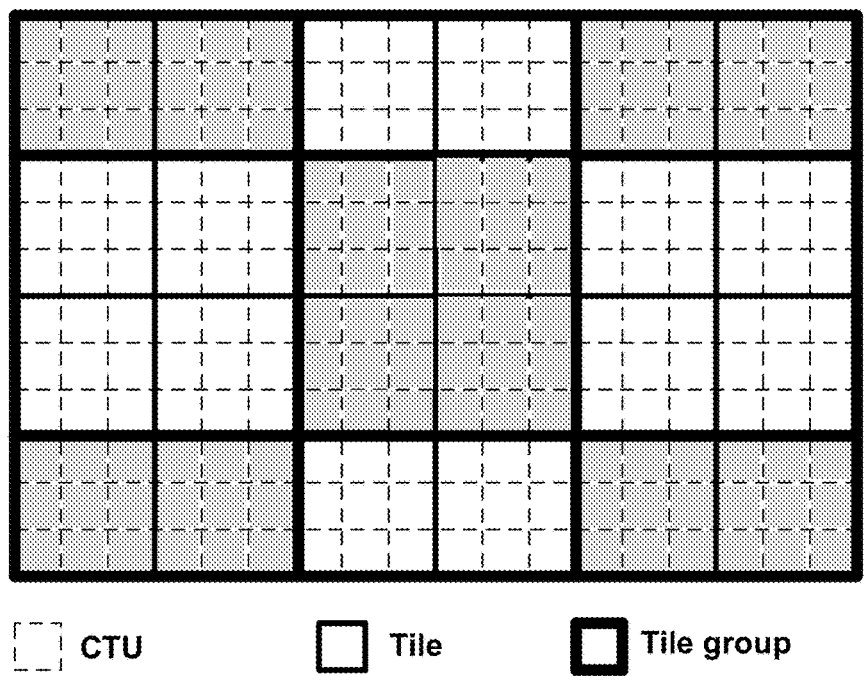
FIG. 5 is a conceptual diagram illustrating a picture divided into tile groups and tiles.

The following describes coded picture partitioning. In some video coding designs, pictures are divided into tile groups and tiles. A tile is a group of CTUs that cover a rectangular region of a picture. A tile group is a group of tiles that cover a rectangular region of a picture. For example, a picture may be divided into 24 tiles (6 tile columns and 4 tile rows) and 9 tile groups, as shown in FIG. 5. In FIG. 5, a picture with 18 by 12 luma CTUs is partitioned into 24 tiles and 9 tile groups.

In some coding designs, a picture may be partitioned into slices, slice segments and tiles. A slice is a sequence of one or more slice segments starting with an independent slice segment and containing all subsequent dependent slice segments (if any) that precede the next independent slice segment (if any) within the same picture. A slice segment is a sequence of coding tree units (CTUs). Likewise, a tile is a sequence of coding tree units.

Figure 6:
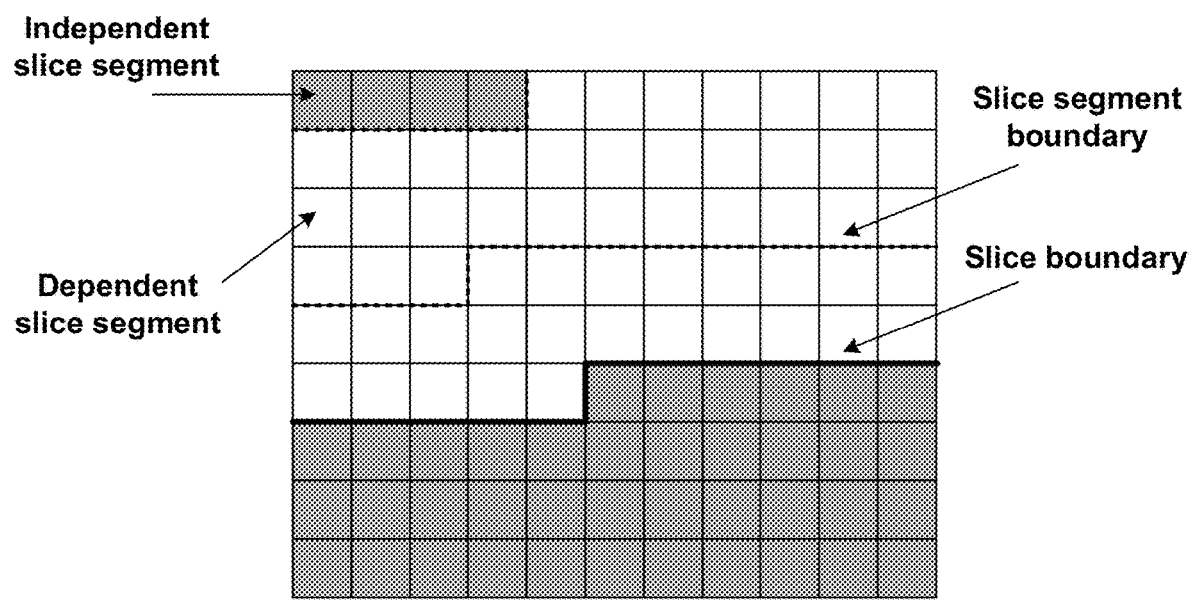
FIG. 6 is a conceptual diagram illustrating a picture with 11 by 9 luma coding tree blocks that is partitioned into two slices.

In the example shown in FIG. 6, the first slice is composed of an independent slice segment containing 4 coding tree units, a dependent slice segment containing 32 coding tree units, and another dependent slice segment containing 24 coding tree units. The second slice includes a single independent slice segment containing the remaining 39 coding tree units of the picture. In FIG. 6, a picture with 11 by 9 luma coding tree blocks is partitioned into two slices, the first of which is partitioned into three slice segments.

Figure 7A:
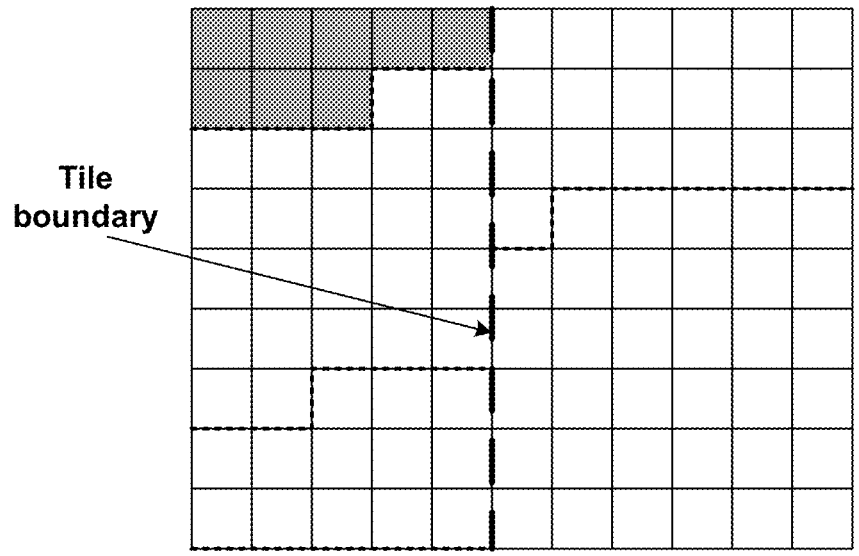
FIG. 7A is a conceptual diagram illustrating a picture with 11 by 9 coding tree blocks that is partitioned into two tiles and one slice.
Figure 7B:
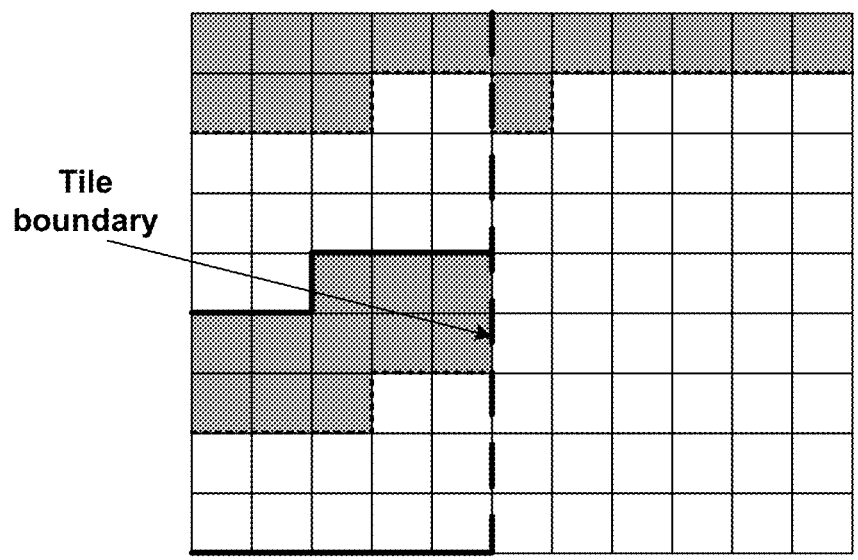
FIG. 7B is conceptual diagram illustrating a picture with 11 by 9 coding tree blocks that is partitioned into two tiles and three slices.

As another example, a picture may be divided into two tiles separated by a vertical tile boundary as shown in FIGS. 7A and 7B. FIG. 7A illustrates a case in which the picture only contains one slice, starting with an independent slice segment and followed by four dependent slice segments. FIG. 7B illustrates a case in which the picture contains two slices in the first tile and one slice in the second tile. In FIG. 7A, a picture with 11 by 9 luma coding tree blocks is partitioned into two tiles and one slice, and in FIG. 7B, a picture with 11 by 9 luma coding tree blocks is partitioned into two tiles and three slices.

The following describes network abstraction layer (NAL) usage. In some video coding designs, a bitstream may be composed two bitstream components: the NAL unit stream format or the byte stream format. The NAL unit stream format is conceptually the more "basic" type and consists of a sequence of syntax structures called NAL units. This sequence is ordered in decoding order. There may be constraints imposed on the decoding order (and contents) of the NAL units in the NAL unit stream.

The video coding layer (VCL) is specified to efficiently represent the content of the video data. The NAL is specified to format that video data and provide header information in a manner appropriate for conveyance on a variety of communication channels or storage media. In some examples, all data are contained in NAL units, each of which contains an integer number of bytes. A NAL unit specifies a generic format for use in both packet-oriented and bitstream systems.

Various NAL unit types can be defined, some examples are given in Table 1. nal_unit_type specifies the type of RBSP data structure contained in the NAL unit as specified in Table 1.

| nal_unit_type | Name of nal_unit_type | Conent of NAL unit and RBSP syntax structure | NAL unit type class |
|---|---|---|---|
| 0 | NONIDR_NUT | Coded tile group of a non-IDR picture tile_group_layer_rbsp( ) | VCL |
| 1 | IDRNUT | Coded tile group of an IDR picture tile_group_layer_rbsp( ) | VCL |

-continued

| nal_unit_type | Name of nal_unit_type | Conent of NAL unit and RBSP syntax structure | NAL unit type class |
|---|---|---|---|
| 2-5 | RSV_VCL_NUT | Reserved VCL NAL Units | VCL |
| 6 | SPS_NUT | Sequence parameter set seq_parameter_set_rbsp( ) | non-VCL |
| 7 | PPS_NUT | Picture parameter set pic_parameter_set_rbsp( ) | non-VCL |
| 8 | HPS_NUT | Header parameter set header_parameter_set_rbsp( ) | non-VCL |
| 9 | SEI_NUT | Supplemental enhancement information sei_rbsp( ) | non-VCL |
| 10-12 | RSV_NONVCL | Reserved | non-VCL |
| 13-15 | UNSPEC_NUT | Unspecified | non-VCL |

Example of NAL unit types defined in HEVC specification is given below:

TABLE 2

NAL unit type codes and NAL unit type classes

| nal_unit_type | Name of nal_unit_type | Content of NAL unit and RBSP syntax structure | NAL unit type class |
|---|---|---|---|
| 0 1 | TRAIL_N TRAIL_R | Coded slice segment of a non-TSA, non-STSA trailing picture slice_segment_layer_rbsp( ) | VCL |
| 2 3 | TSA_N TSA_R | Coded slice segment of a TSA picture slice_segment_layer_rbsp( ) | VCL |
| 4 5 | STSA_N STSA_R | Coded slice segment of an STSA picture slice_segment_layer_rbsp( ) | VCL |
| 6 7 | RADL_N RADL_R | Coded slice segment of a RADL picture slice_segment_layer_rbsp( ) | VCL |
| 8 9 | RASL_N RASL_R | Coded slice segment of a RADL picture slice_segment_layer_rbsp( ) | VCL |
| 10 12 14 | RSV_VCL_N10 RSV_VCL_N12 RSV_VCL_N14 | Reserved non-IRAP SLNR VCL NAL unit types | VCL |
| 11 13 15 | RSV_VCL_R11 RSV_VCL_R13 RSV_VCL_R15 | Reserved non-IRAP sub-layer reference VCL NAL unit types | VCL |
| 16 17 18 | BLA_W_LP BLA_W_RADL BLA_N_LP | Coded slice segment of a BLA picture slice_segment_layer_rbsp( ) | VCL |
| 19 20 | IDR_W_RADL IDR_N_LP | Coded slice segment of an IDR picture slice_segment_layer_rbsp( ) | VCL |
| 21 | CRA_NUT | Coded slice segment of a CRA picture slice_segment_layer_rbsp( ) | VCL |
| 22 23 | RSV_IRAP_VCL22 RSV_IRAP_VCL23 | Reserved IRAP VCL NAL unit types | VCL |
| 24 . . . 31 | RSV_VCL24 . . . RSV_VCL31 | Reserved non-IRAP VCL NAL unit types | VCL |
| 32 | VPS_NUT | Video parameter set video_parameter_set_rbsp( ) | non-VCL |
| 33 | SPS_NUT | Sequence parameter set seq_parameter_set_rbsp( ) | non-VCL |
| 34 | PPS_NUT | Picture parameter set pic_parameter_set_rbsp( ) | non-VCL |
| 35 | AUD_NUT | Access unit delimiter access_unit_delimiter_rbsp( ) | non-VCL |
| 36 | EOS_NUT | End of sequence end_of_seq_rbsp( ) | non-VCL |

TABLE 2-continued

NAL unit type codes and NAL unit type classes

| nal_unit_type | Name of nal_unit_type | Content of NAL unit and RBSP syntax structure | NAL unit type class |
|---|---|---|---|
| 37 | EOB_NUT | End of bitstream end_of_bitstream_rbsp( ) | non-VCL |
| 38 | FD_NUT | Filler data filler_data_rbsp( ) | non-VCL |
| 39 | PREFIX_SEI_NUT | Supplemental enhancement information sei_ibsp( ) | non-VCL |
| 40 | SUFFIX_SEI_NUT | | non-VCL |
| 41 ... 47 | RSV_NVCL41 ... RSV_NVCL47 | Reserved | non-VCL |
| 48 ... 63 | UNSPEC48 ... UNSPEC63 | Unspecified | non-VCL |

There may be issues with techniques related to the usage and signaling of ALF filer coefficients. ALF filter coefficients (or update to the basis filter set) are signaled at the slice level and update to the ALF buffer is not possible until the current slice is decoded. In some implementations, the ALF buffer is updated only after a complete picture is decoded. In such cases, different slices of the same picture cannot use ALF coefficients signaled for another slice of the same picture and this may lead to increase in the ALF signaling cost.

In one current example ALF design, syntax related to a temporal prediction method of ALF filters (e.g., temporal prediction for ALF) is implemented at a slice level because of an implicit assumption that a frame is coded inside one slice. Consequently, in some example techniques, most of ALF related syntax is coded inside the slice header. That is, in these techniques, temporal prediction for ALF is used only if slice type is P or B (e.g., blocks within the slice are inter coded). A slice type of P or B may also be referred to as inter coded slices. Techniques in which temporal prediction for ALF is limited to slices that are inter coded may lead to redundant coding of filters in the case when a frame is coded as a set of slices, including slices of intra type (I slices) (e.g., blocks within the slice are intra coded). In this case, for every P or B frame having an I slice(s) inside, the I slice cannot use ALF coefficients stored in the buffer and signaling of a new ALF coefficients may be needed, which impacts bandwidth.

To enable flexibility of the ALF usage within a coded picture comprising several slices/tiles group/tiles or CTUs, the disclosure describes a new method of adaptive loop filter buffer construction. However, the techniques should not be considered limited or requiring filter buffer construction. In one or more examples, the techniques may remove slice/tiles/CTU dependency from this process.

For instance, as described above, in some techniques temporal prediction for ALF may have dependent upon the slice type. Temporal prediction for ALF was available for inter coded slices (e.g., slice type of P or B) but was not available for intra coded slices (e.g., slice type of I).

In one or more examples, video encoder 200 and video decoder 300 may determine that temporal prediction for adaptive loop filter (ALF) is enabled for one or more intra coded slices and determine ALF coefficients for one or more blocks of the one or more intra coded slices based on ALF coefficients of a previously coded picture or slice (e.g., based on temporal prediction for ALF being enabled). Video encoder 200 and video decoder 300 may apply the determined ALF coefficients to the one or more blocks to generate one or more filtered blocks. In one or more such examples, video encoder 200 and video decoder 300 may determine that temporal prediction for ALF is enabled without determining a slice type of the one or more blocks.

The following describes harmonization of temporal and intra-picture ALF prediction. In some examples that employ coded picture partitioning in non-single tiles group/tile/slice or CTU, signaled ALF filter entity (e.g., coefficient) may be shared between different slices/tiles group/tiles/CTU. Thus, a partitioning element (such as a slice) can use ALF entities (e.g., coefficities or parameter) signaled for previously coded partitioning elements within current picture, thus enabling intra-picture ALF prediction.

For example, one or more blocks of a slice (e.g., intra coded slice or inter coded slice) in a current picture may utilize ALF coefficients used for adaptive loop filtering of one or more blocks of another previously coded slice in the same current picture. As an example, a picture may include one or more intra coded slices and temporal prediction for ALF may be enabled. In this example, video encoder 200 and video decoder 300 may determine ALF coefficients for one or more blocks of the one or more intra coded slices based on ALF coefficients of a previously coded slice which is in the same picture. Video encoder 200 and video decoder 300 may determine ALF coefficients of one or more blocks of an intra coded slice of the picture based on ALF coefficients of an inter coded slice of the picture or based on ALF coefficients of an intra coded slice of the picture.

The logic defined for temporal ALF filters (e.g., in JEM design) can be extended toward in-picture ALF prediction. Below is an example of such syntax:

---
alf_from_buffer_flag
if (alf_from_buffer_flag) {
    alf_from_buffer_index
---

The following describes ALF logic dependency on NAL unit type. In one example, ALF application logic can depend directly on current NAL unit type, of that slice header is inside, determining if temporal prediction of set of filters of ALF is used or not, instead of slice type. For example, in some cases, the slice type is used to determine the ALF application logic such as if temporal prediction of set of filters of ALF is used (e.g., whether temporal prediction for ALF is enabled); however, in one or more examples of this disclosure, the ALF application logic of whether temporal prediction of set of filters of ALF is used (e.g., whether temporal prediction for ALF is enabled) is not based on the slice type (e.g., may be based on the NAL unit type). In particular, the following syntax of the slice header related to temporal prediction of ALF filters may be used:

---
if (nal_unit_type != BLA_W_LP && nal_unit_type != BLA_W_RADL
&& nal_unit_type != BLA_N_LP && nal_unit_type != IDR_W_RADL
&& nal_unit_type != IDR_N_LP && nal_unit_type != CRA_NUT
) {
    alf_temporal_flag
    if (alf_temporal_flag) {
        alf_temporal_index
    }
}
---

In an example given above, NAL unit types are defined as in Table 2. In some examples, the usage of temporal prediction for ALF is possible only for pictures that can reference to earlier decoded pictures. In some examples, the usage of temporal prediction for ALF is not possible for pictures of IRAP, IDR, or CRA types. In some examples, the temporal prediction of ALF filters is not possible only for pictures that do not refer to any pictures other than itself for inter prediction in its decoding process. In some examples, the usage of temporal buffer of ALF is not possible only for pictures that are marked as random access pictures (RAP pictures), as in example below.

```
if ( !RAPflag ) {
    alf_temporal_flag
    if (alf_temporal_flag) {
        alf_temporal_index
    }
}
```

In some examples, signaling of syntax elements specifying the usage of stored filter may depend on the temporal layer index associated with currently decoded picture. Pictures with lowest hierarchy temporal index cannot use temporal ALF buffer, while pictures with higher temporal levels, denoted by corresponding indices, may use temporal buffer in accordance with used coded index. In example below, corresponding syntax variable nuh_layer_id of JEM test model is used:

```
if (nuh_layer_id != 0) {
    alf_temporal_flag
    if (alf_temporal_flag) {
        alf_temporal_index
    }
}
```

In some examples, the legal range of the alf_temporal_index values can be equal to integer numbers from 0 to 5, thus enabling access to the filter buffer of size 6 entries.

As described above, in some examples, temporal prediction for ALF may not available for certain types of pictures such as IRAP, RAP, IDR, or CRA types of pictures and may not be available for pictures having nuh_layer_id equal to 0 (i.e., pictures in the base layer in a hierarchical coding scheme. However, as also described above, temporal prediction for ALF may be available for intra coded slices. Accordingly, in one or more examples described in this disclosure, while temporal prediction for ALF may be available for intra coded slices, temporal prediction for ALF may not be available for all intra coded slices. There may be coding benefits by limiting for which intra coded slices temporal prediction for ALF can be available.

For example, in some cases, pictures of types IRAP, RAP, IDR, or CRA may be specifically included to avoid error propagation from dropped pictures and to allow for video skipping as described above. Accordingly, to ensure that picture of types IRAP, RAP, IDR, or CRA can be completely reconstructed and filtered without need of information from another picture, temporal prediction of ALF may be disabled for such pictures. In some examples, video encoder 200 and video decoder 300 may determine that temporal prediction for ALF is enabled by determining that the picture is not one of intra random access picture (IRAP), random access picture (RAP), instantaneous decoder refresh (IDR), or clean random access (CRA) types.

Also, as described above, in a hierarchical coding scheme, pictures of higher layers (e.g., those with higher temporal index values) cannot be used to reconstruct pictures in lower layers (e.g., those with lower temporal index values) since these pictures in the higher layer may be dropped for bandwidth or processing reasons. Accordingly, to ensure that a picture in a base layer does not need ALF coefficients from a picture in another layer (e.g., layer with higher temporal index value), temporal prediction for ALF may be disabled for pictures having a temporal index value of 0 (e.g., temporal prediction for ALF may be disabled for pictures in the base layer). In some examples, video encoder 200 and video decoder 300 may determine that temporal prediction for ALF is enabled based on the picture having a temporal index value that is not equal to 0.

As described above, if a temporal layer index value for a current slice or picture is greater than or equal to a temporal layer index value for another slice or picture, the ALF coefficients for this other slice or picture may be used as predictors for the ALF coefficients for the current slice or picture, and if a temporal layer index value for a current slice or picture is less than a temporal layer index value for another slice or picture, the ALF coefficients for this other slice or picture may not be used as predictors for the ALF coefficients for the current slice or picture. There may be various ways in which to ensure that the ALF coefficients for the other picture are used as predictors for a current slice or picture only when the temporal index value for the other picture is less than or equal to the temporal index value for the current slice or picture.

As one example, ALF filter coefficients may be signaled in a dedicated adaptation parameter set (APS) NAL unit with a certain temporalID (e.g., temporal level index value) and the APS is identified by a adaptation_parameter_set_id value. If NalUnitType is equal to APS_NUT, TemporalId shall be less or equal to that of the layer access unit containing the NAL unit, where current APS is being signaled. To establish temporal ALF prediction for a slice, video encoder 200 and video decoder 300 may use the slice_aps_id_value for the slice. In some examples, TemporalId of the APS NAL unit having adaptation_parameter_set_id equal to slice_aps_id (e.g., the slice whose ALF coefficients are being used as predictors for temporal prediction for ALF) shall be less than or equal to the TemporalId of the coded slice NAL unit (e.g., the slice whose ALF coefficients are going to be determined from the ALF coefficients of another slice or picture).

The following describes dependency-free signaling of the ALF usage. Usage of stored filter logic can depend on the syntax elements signaled at the picture, slice, tiles or other level. The value of syntax elements can be constrained by the NAL unit type, or other.

Possible syntax of such design is shown below, where text that is bolded, italicized, and underlined means removal of the condition, which shows that whether temporal prediction for ALF is enabled is determined without determining a slice type.

```
if (slice_type != I){
    alf_buffer_flag
    if (alf_buffer_flag) {
        alf_buffer_index
    }
}
```

Using NAL types examples in Table 1, constrains on the alf_buffer_flag can be defined as following: For tile groups/slices/tiles or CTU of coded picture with NAL unit type equal to IDR_NUT, the value of syntax element alf_temporal_flag shall be equal to 0.

In one example, alf_buffer_flag syntax element is not signaled in header of tile groups/slices/tiles or CTU of coded picture with NAL unit type equal to IDR_NUT. Instead, alf_buffer_flag is derived set to be equal to 0 at the decoder side.

The following describes ALF buffer control. In one example, process of ALF buffer usage at the slice/tiles group/tiles and process of the ALF buffer control can be decoupled. Separate syntax elements to control status of the ALF buffer can be signaled. Such control can be implemented through alf_reset_buffer_flag to reset the current alf buffer (clearing stored alf filters, or marking them un-usable) and a flag alf_store_in_buffer_flag to add currently signaled filter(s) to the ALF buffer, if a new filter is signalled and thus alf_present_flag is equal to 1.

Example of such syntax is shown below:

```
alf_buffer_flag
if (alf_buffer_flag) {
   alf_buffer_index
}
Else
   alf_reset_buffer_flag
   alf_data( )
   alf_store_in_buffer_flag
}
```

In some examples, for tile groups/slices/tiles or CTU of coded picture with NAL unit type equal to IDR_NUT, the value of syntax element alf_reset_buffer_flag shall be equal to 1. For some examples, alf_reset_buffer_flag value is constrained to be equal to 1 only for the first tile group/slice/tile or CTU of the picture with NUL unit type equal to IDR_NUT, thus allowing re-usage of signalled ALF filters between different slices/tiles group/tiles/CTU.

The following may also be for ALF filtering:, M. Karczewicz, L. Zhang, W.-J. Chien, X. Li, "EE2.5: Improvements on adaptive loop filter", Exploration Team (JVET) of ITU-T SG 16 WP 3 and ISO/IEC JTC 1/SC 29/WG 11, Doc. JVET-B0060, $2^{nd}$ Meeting: San Diego, USA, 20 Feb.-26 Feb. 2016, and M. Karczewicz, L. Zhang, W.-J. Chien, X. Li, "EE2.5: Improvements on adaptive loop filter", Exploration Team (JVET) of ITU-T SG 16 WP 3 and ISO/IEC JTC 1/SC 29/WG 11, Doc. JVET-00038, $3^{rd}$ Meeting: Geneva, CH, 26 May-1 Jun. 2016.

Figure 2A:
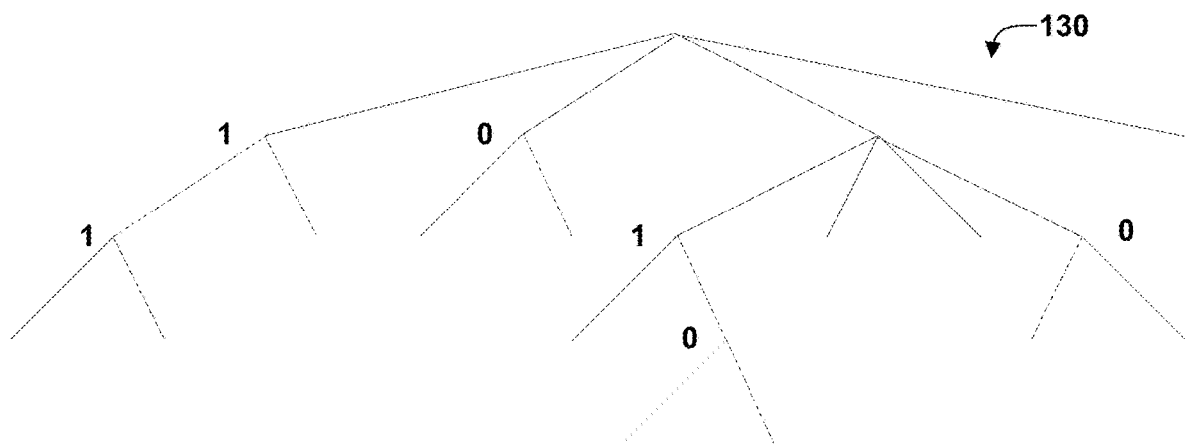
FIGS. 2A and 2B are conceptual diagrams illustrating an example quadtree binary tree (QTBT) structure, and a corresponding coding tree unit (CTU).
Figure 2B:
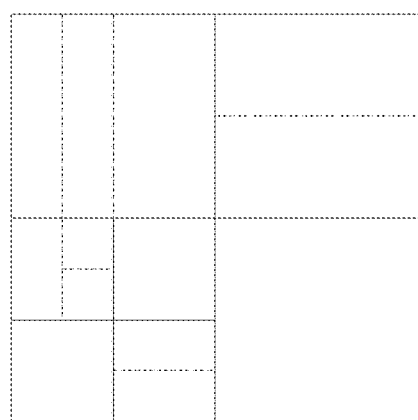

FIGS. 2A and 2B are conceptual diagram illustrating an example QTBT structure 130, and a corresponding CTU 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, then the node may not be further split by the binary tree, because the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having width equal to MinBTSize (4, in this example) implies no further horizontal splitting is permitted. Similarly, a binary tree node having a height equal to MinBTSize implies no further vertical splitting is permitted for that binary tree node. As noted above, leaf nodes of the binary tree are referred to as CUs and are further processed according to prediction and transform without further partitioning.

Figure 3:
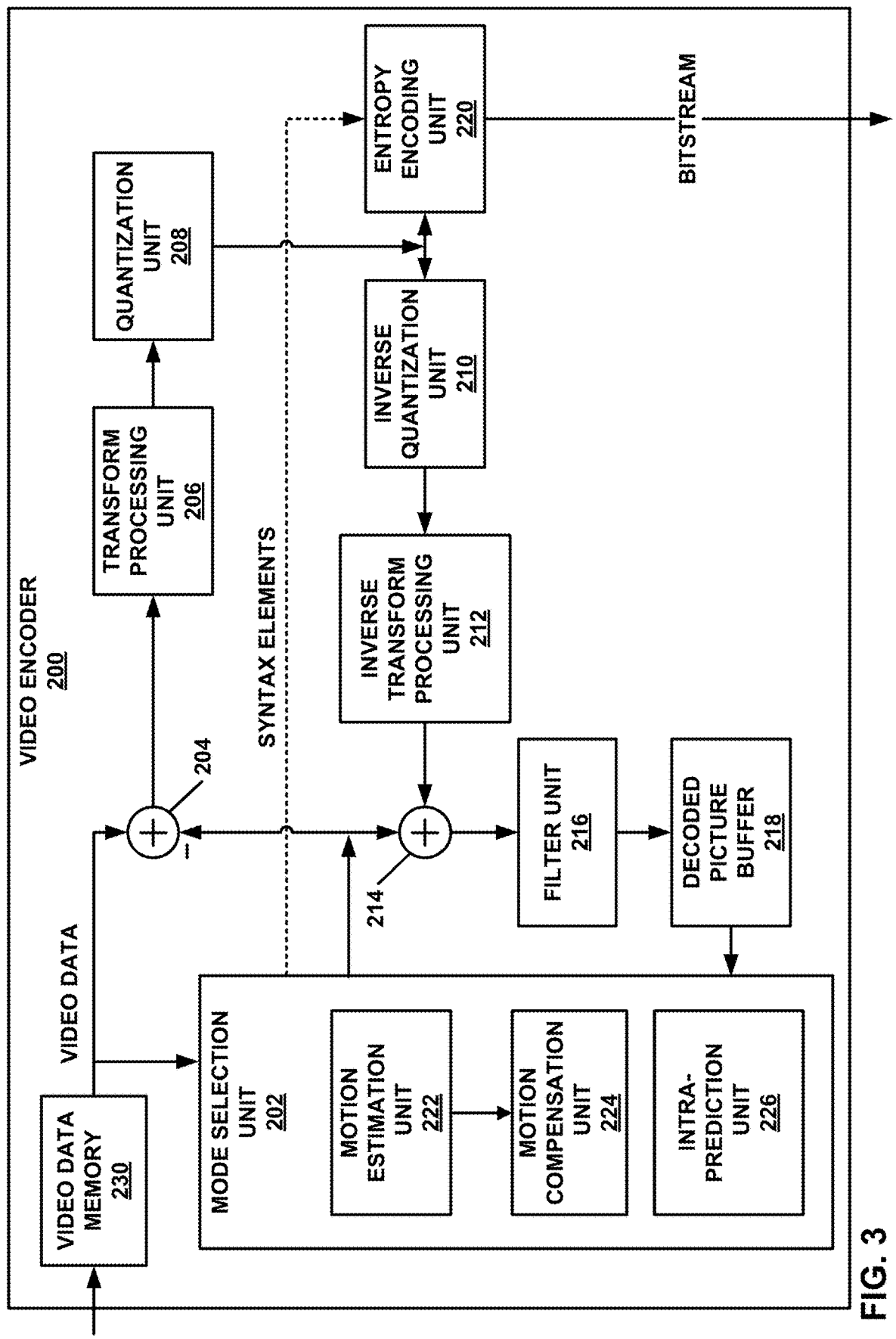
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Inverse quantization unit 210, inverse transform processing unit 212, and reconstruction unit 214 may be part of a decoding process performed to generate prediction blocks for encoding. For example, the output of the reconstruction unit 214 may be a reconstructed block that is further filtered by filter unit 216. The output of filter unit 216 may be a filtered block that is stored in DPB 218. This filtered block may then be used as a prediction block for encoding a subsequent block. For instance, motion estimation unit 222 and motion compensation unit 224 may utilize the filtered block to generate a prediction block for inter-predicting a subsequent block.

Filter unit 216 may perform one or more filter operations on reconstructed blocks. For example, filter unit 216 may perform deblocking operations to reduce blockiness artifacts along edges of CUs and/or ALF techniques. Operations of filter unit 216 may be skipped, in some examples.

In accordance with one or more examples described in this disclosure, filter unit 216 may be configured to perform ALF. For instance, as described above, ALF techniques may be used to minimize the mean square error between original pixels and decoded pixels. As one example, the original pixels may be the video data of a block received by residual generation unit 204 and the decoded pixels may be the reconstructed block output by reconstruction unit 214. Mode selection unit 202 or possibly filter unit 216 may determine ALF coefficients (e.g., f(k,l)) to apply to a reconstructed block R(i, j) as follows, in accordance with one non-limiting example:

$$\tilde{R}(i, j) = \sum_{k=-K}^{K} \sum_{l=-K}^{K} f(k, l) R(i+k, j+l) / \sum_{k=-K}^{K} \sum_{l=-K}^{K} f(k, l),$$

where i and j are the coordinates of the pixels within the block. Mode selection unit 202 and/or filter unit 216 may determine the f(k,l) that minimize the mean square error between the block of video data and reconstructed block.

In some examples, rather than signaling the ALF coefficients, it may be possible enable temporal prediction of ALF so that ALF coefficients for a previously coded picture or slice (e.g., where the slice is in the same picture as the block being coded or in a different picture) are predictors for determining the ALF coefficients to be used for filtering a current block. Rather than signaling f(k,l) for a current picture, slice, or block, in temporal prediction for ALF, it may be possible to utilize the f(k,l) for a previous picture, slice, or block to determine the f(k,l) for the current picture, slice, or block.

In accordance with techniques described in this disclosure, the temporal prediction for ALF may be available for intra coded slices as well. For example, mode selection unit 202 and/or filter unit 216 may determine that temporal prediction for adaptive loop filter (ALF) is enabled for one or more intra coded slices and determine ALF coefficients for one or more blocks of the one or more intra coded slices based on ALF coefficients of a previously coded picture or slice. Filter unit 216 may apply the determined ALF coefficients to the one or more blocks to generate one or more filtered blocks (e.g., apply the ALF coefficients to reconstruction block R(i,j) to generate $\tilde{R}$(i,j)). In determining that temporal prediction for ALF is enabled, mode selection unit 202 and/or filter unit 216 may determine that temporal prediction for ALF is enabled without determining a slice type of the one or more blocks (e.g., if slice_type is I may not impact whether temporal prediction for ALF is enabled).

Where temporal prediction of ALF is enabled, mode selection unit 202 and/or filter unit 216 may cause syntax elements indicating the temporal prediction for ALF is enabled to be signaled but may be not in the slice header. In some cases, but not necessarily all cases, by removing the information indicating that temporal prediction of ALF is enabled from the slice header, extending techniques described in this disclosure to intra coded slices (e.g., intra coded blocks within slices) may be possible. However, it may still be possible to signal information indicating that ALF is enabled in the slice header and still allow for temporal prediction for ALF in intra coded slices.

In some examples, temporal prediction for ALF, even for intra coded slices, may not be allowed. For instance, mode selection unit 202 and/or filter unit 216 may determine that that temporal prediction for ALF is enabled based on the picture having a temporal index value that is not equal to 0. As another example, mode selection unit 202 and/or filter unit 216 may determine that that temporal prediction for ALF is enabled by determining that temporal prediction for ALF is enabled in the case that the picture is not one of intra random access picture (IRAP), random access picture (RAP), instantaneous decoder refresh (IDR), or clean random access (CRA) types.

As described above, in some examples, the slice whose ALF coefficients are used to determine the ALF coefficients for a block in a current slice may be in the same picture. For instance, mode selection unit 202 and/or filter unit 216 may determine ALF coefficients of one or more blocks of an intra coded slice of the picture based on ALF coefficients of an inter coded slice of the picture. As another example, mode selection unit 202 and/or filter unit 216 may determine ALF coefficients of one or more blocks of an inter coded slice of the picture based on ALF coefficients of an intra coded slice of the picture. As another example, mode selection unit 202 and/or filter unit 216 may determine ALF coefficients of one or more blocks of an inter coded slice of the picture based on ALF coefficients of another inter coded slice of the picture. As another example, mode selection unit 202 and/or filter unit 216 may determine ALF coefficients of one or more blocks of an intra coded slice of the picture based on ALF coefficients of another intra coded slice of the picture.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed (and potentially filtered) blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry (e.g., at least one of fixed-function or programmable circuitry) and configured to perform example techniques described in this disclosure. As one example, mode selection unit 202 together with filter unit 216 and DPB 218 may be configured to perform the example techniques.

Figure 4:
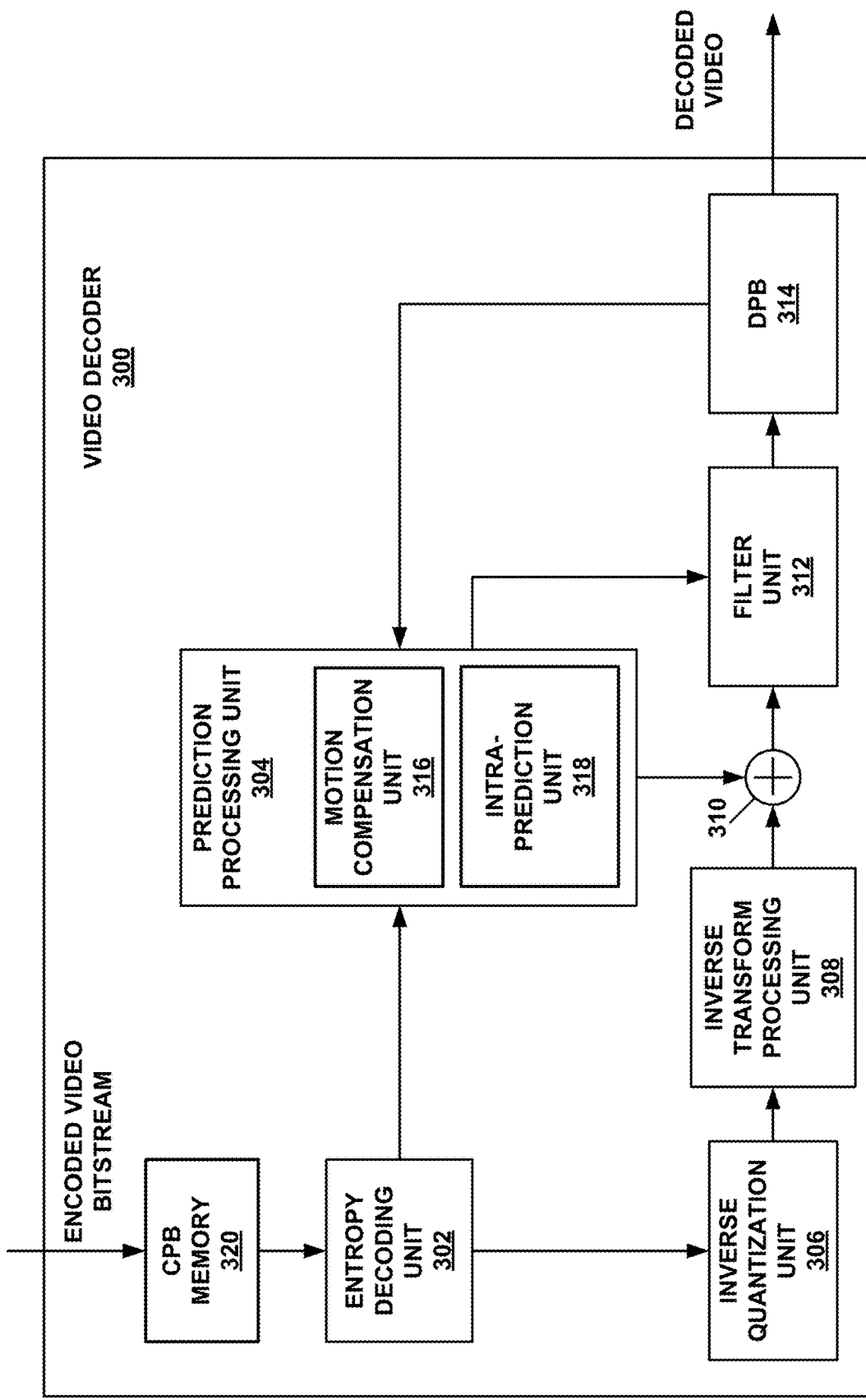
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 in the context of video coding standards such as the HEVC video coding standard and the H.266 video coding standard in development. However, the techniques of this disclosure are not limited to these video coding standards, and are applicable generally to video encoding and decoding.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks and/or ALF techniques. Operations of filter unit 312 are not necessarily performed in all examples.

As illustrated in FIG. 3, filter unit 312 may perform its operation subsequent to a reconstruction process performed by reconstruction unit 310. For instance, filter unit 312 may be configured to apply determined ALF coefficients to one or more block to generated one or more filtered blocks. Filter unit 312 may apply the determined ALF coefficients, subsequent to the reconstruction process, to generate the one or more filtered blocks. The one or more filtered blocks may be used as prediction blocks for reconstructing subsequent blocks and may form the decoded video data that is output by video decoder 300, in some examples.

In accordance with one or more examples described in this disclosure, filter unit 312 may be configured to perform ALF. For instance, filer unit 312 may apply the following equation to reconstructed block R(i, j) (e.g., as output by reconstruction unit 310), in accordance with one non-limiting example:

$$\tilde{R}(i, j) = \sum_{k=-K}^{K} \sum_{l=-K}^{K} f(k, l) R(i+k, j+l) / \sum_{k=-K}^{K} \sum_{l=-K}^{K} f(k, l),$$

where i and j are the coordinates of the pixels within the block and f(k,l) are the ALF coefficients. In the above equation, $\tilde{R}(i, j)$ is the result of applying the ALF coefficients to the reconstructed block to generate the one or more filtered blocks (e.g., $\tilde{R}(i, j)$ is an example of the filtered block).

In some examples, video encoder 200 may signal the ALF coefficients. However, in accordance with techniques described in this disclosure, rather than video encoder 200 signaling the ALF coefficients, video encoder 200 may signal information indicating that temporal prediction for ALF is enabled and signal information indicating that ALF coefficients of which previously coded picture or slice is being used as a predictor to determine the ALF coefficients for a current block, slice, or picture. In one or more examples, the temporal prediction for ALF may be enabled for a picture having one or more intra coded slices.

For example, prediction processing unit 304 and/or filter unit 312 may determine that temporal prediction for adaptive loop filter (ALF) is enabled for one or more intra coded slices and determine ALF coefficients for one or more blocks of the one or more intra coded slices based on ALF coefficients of a previously coded picture or slice. Filter unit 312 may apply the determined ALF coefficients to the one or more blocks to generate one or more filtered blocks.

In some examples, prediction processing unit 304 and/or filter unit 312 may determine that temporal prediction for ALF is enabled without determining a slice type of the one or more blocks. Also, in some examples, prediction processing unit 304 and/or filter unit 312 may determine that temporal prediction for ALF is enabled based on signaled information that is not signaled in a slice header. In examples where temporal prediction for ALF is enabled, prediction processing unit 304 and/or filter unit 312 may also receive signaled information that indicates that ALF coefficients from which previously coded picture, slice, or block are to be utilized to predict ALF coefficients for the one or more intra coded slices or inter coded slices for which temporal prediction for ALF is enabled.

In some examples, temporal prediction for ALF, even for intra coded slices, may not be allowed. For instance, prediction processing unit 304 and/or filter unit 312 may determine that that temporal prediction for ALF is enabled based on the picture having a temporal index value that is not equal to 0. As another example, prediction processing unit 304 and/or filter unit 312 may determine that that temporal prediction for ALF is enabled by determining that temporal prediction for ALF is enabled in the case that the picture is not one of intra random access picture (IRAP), random access picture (RAP), instantaneous decoder refresh (IDR), or clean random access (CRA) types.

As described above, in some examples, the slice whose ALF coefficients are used to determine the ALF coefficients for a block in a current slice may be in the same picture. For instance, prediction processing unit 304 and/or filter unit 312 may determine ALF coefficients of one or more blocks of an intra coded slice of the picture based on ALF coefficients of an inter coded slice of the picture. As another example, prediction processing unit 304 and/or filter unit 312 may determine ALF coefficients of one or more blocks of an inter coded slice of the picture based on ALF coefficients of an intra coded slice of the picture. As another example, prediction processing unit 304 and/or filter unit 312 may determine ALF coefficients of one or more blocks of an inter coded slice of the picture based on ALF coefficients of another inter coded slice of the picture. As another example, prediction processing unit 304 and/or filter unit 312 may determine ALF coefficients of one or more blocks of an intra coded slice of the picture based on ALF coefficients of another intra coded slice of the picture.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry (e.g., at least one of fixed-function or programmable circuitry) and configured to perform the example techniques described in this disclosure. For example, prediction processing unit 304 together with filter unit 312 and DPB 314 may be configured to perform the example techniques described in this disclosure.

Figure 8:
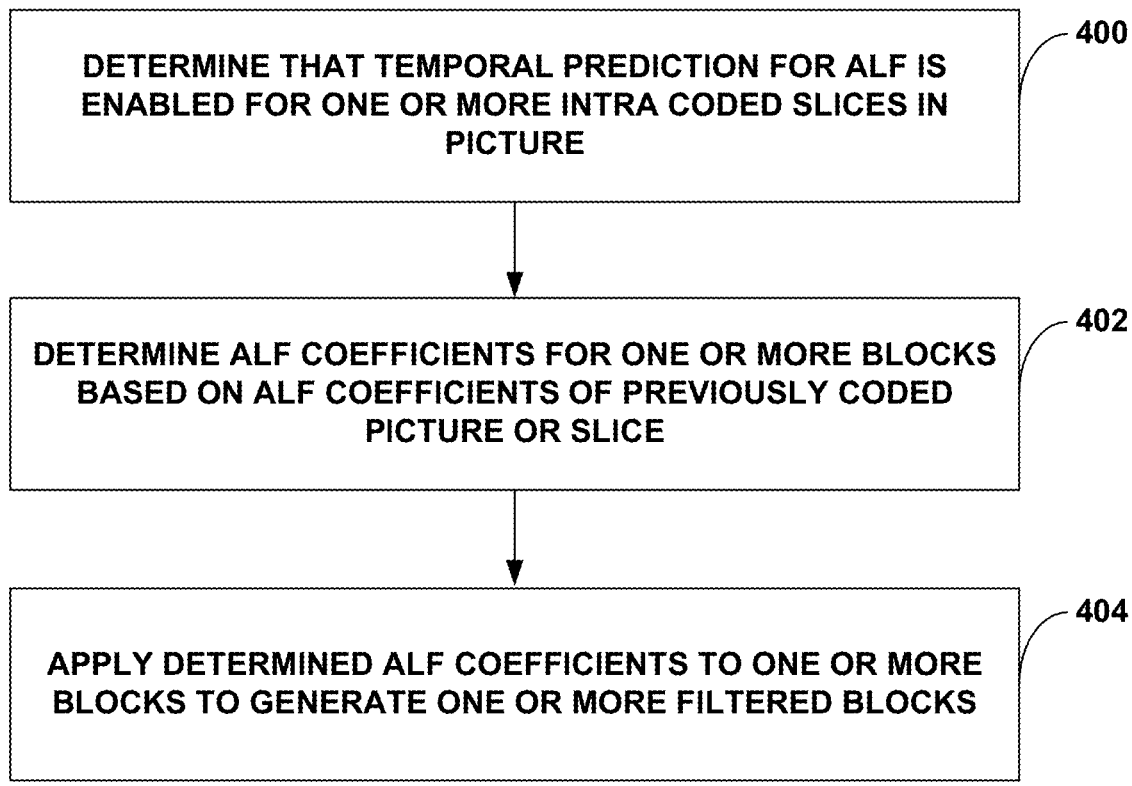
FIG. 8 is a flowchart illustrating an example method of operation in accordance with one or more examples described in this disclosure.

FIG. 8 is a flowchart illustrating an example method of operation in accordance with one or more examples described in this disclosure. For ease of description, the example of FIG. 8 is described with respect to processing circuitry. As one example, processing circuitry includes video encoder 200, including processing circuitry for mode selection unit 202 and filter unit 216. As another example, processing circuitry includes video decoder 300, including processing circuitry for prediction processing unit 304 and filter unit 312. The processing circuitry may be at least one of fixed-function or programmable circuitry (e.g., fixed-function, programmable, or a combination of fixed-function and programmable circuitry).

In one or more examples, memory (e.g., memory 106, video data memory 230, DPB 218, memory 120, CBP memory 320, DPB 314, or some other memory) may store ALF coefficients for a previously coded picture or slice. In accordance with one or more examples, the ALF coefficients for the previously coded picture or slice may be used for temporal prediction of ALF for determining ALF coefficients for one or more blocks, slices, or a picture.

For instance, the processing circuitry may determine that temporal prediction for ALF is enabled for one or more intra coded slices (400). The processing circuitry may determine that ALF is enabled without determining a slice type of the one or more blocks. In some examples, the processing circuitry may determine that temporal prediction for ALF is enabled based on the picture having a temporal index value that is not equal to 0 (e.g., not in the base layer). In some examples, the processing circuitry may determine that temporal prediction for ALF is enabled by determining that temporal prediction for ALF is enabled in the case that the picture is not one of IRAP, RAP, IDR, or CRA types.

Where the processing circuitry is video decoder 300 or part of video decoder 300, the processing circuitry may determine that temporal prediction for ALF is enabled based on signaled information that is not signaled in a slice header. In such examples, where processing circuitry is video encoder 200 or part of video encoder 200, the processing circuitry may not signal information indicating that temporal prediction for ALF is enabled in a slice header.

The processing circuitry may determine ALF coefficients for one or more blocks of the one or more of the one or more intra coded slices based on ALF coefficients of the previously coded picture or slice (402). In this way, even if the blocks are part of an intra coded slice, temporal prediction for ALF may be enabled. In some examples, the processing circuitry may determine ALF coefficients of one or more blocks of an intra coded slice of the picture based on ALF coefficients of an inter coded slice of the picture.

The processing circuitry may determine the ALF coefficients based on information signaled indicating from which previously coded picture or slice the ALF coefficients should be used. In some examples, the ALF coefficients for the one or more blocks may be set equal to the ALF coefficients for the previously coded picture or slice. In some examples, the ALF coefficients for the one or more blocks may be equal to the ALF coefficients for the previously coded picture or slice plus a delta value.

The processing circuitry may apply the determined ALF coefficients to the one or more blocks to generate one or more filtered blocks (404). For example, the processing circuitry may perform the operations defined by:

$$\tilde{R}(i, j) = \sum_{k=-K}^{K} \sum_{l=-K}^{K} f(k, l) R(i+k, j+l) / \sum_{k=-K}^{K} \sum_{l=-K}^{K} f(k, l),$$

where i and j are the coordinates of the pixels within the block and f(k,l) are the ALF coefficients. The above is one non-limiting example way of applying the ALF coefficients.

In examples where the processing circuitry represents video encoder 200, the processing circuitry may be configured to apply the determined ALF coefficients, subsequent to a decoding process, to generate the one or more filtered blocks. In examples where the processing circuitry represents video decoder 300, the processing circuitry may be configured to apply the determined ALF coefficients, subsequent to a reconstruction process, to generate the one or more filtered blocks.

The following are some example techniques that may be performed together and/or in combination with any of the techniques described in this disclosure. The following examples are merely some examples and should not be considered limiting or necessary in all examples.

EXAMPLE 1

A method of decoding video data, the method comprising receiving adaptive loop filter (ALF) filter entity for a first partitioning element in a picture, determining ALF filter entity in a second partitioning element in the same picture based on the received ALF filter entity for the first partitioning element, and reconstructing the picture based on the ALF filter entity in the first partitioning element and the second partitioning element.

EXAMPLE 2

The method of example 1, wherein the first partitioning element and the second partitioning element comprise a first slice and a second slice, respectively.

EXAMPLE 3

The method of any of examples 1 and 2, wherein determining ALF filter entity in the second partitioning element comprises utilizing techniques similar to those for temporal ALF prediction between different pictures to determine the ALF filter entity in the second partitioning element.

EXAMPLE 4

A method of decoding video data, the method comprising determining whether temporal prediction of a set of filters for ALF is enabled based on a network abstraction layer (NAL) unit type and reconstructing a current picture based on the determination of whether temporal prediction of the set of filters for ALF is enabled.

EXAMPLE 5

The method of example 4, wherein determining whether temporal prediction of the set of filters for ALF is enabled based on the NAL unit type comprises determining whether temporal prediction of the set of filters for ALF is enabled based on the NAL unit type without determining a slice type.

EXAMPLE 6

The method of any of examples 4 and 5, wherein determining whether temporal prediction of the set of filters for ALF is enabled comprises one or more of determining that temporal prediction of ALF is available only for pictures that can reference to earlier decoded pictures, determining that temporal prediction of ALF is not available for pictures of intra random access picture (IRAP), instantaneous decoder refresh (IDR), or clean random access (CRA) types, determining that temporal prediction of ALF is not available for pictures that do not refer to any picture other than itself, and determining that temporal prediction of ALF is not available for random access pictures (RAP).

EXAMPLE 7

A method of decoding video data, the method comprising determining whether usage of stored filter for ALF is available based on temporal layer index of a current picture, wherein for a first picture having a lowest temporal index, determining whether usage of stored filter for ALF is available comprises determining that temporal ALF buffer is not available, and wherein for a second picture having a temporal index other than the lowest temporal index, determining whether usage of stored filter for ALF is available comprises determining that temporal ALF buffer is available.

EXAMPLE 8

A method of decoding video data, the method comprising determining whether usage of stored filter for ALF is available based on one or more signaled syntax elements and reconstructing a current picture based on the determination of whether usage of stored filter for ALF is available based on one or more signaled syntax elements

EXAMPLE 9

The method of example 8, wherein the one or more signaled syntax elements comprise syntax elements signaled at a picture, slice, or tile level.

EXAMPLE 10

The method of any of examples 8 and 9, wherein the one or more syntax elements are constrained by the network abstraction layer (NAL) unit type.

EXAMPLE 11

A method of decoding video data, the method comprising receiving separate syntax elements that control status of an ALF buffer.

EXAMPLE 12

A method comprising any combination of examples 1-11.

EXAMPLE 13

A method of encoding video data, the method comprising determining adaptive loop filter (ALF) filter entity for a first partitioning element in a picture, determining ALF filter entity in a second partitioning element in the same picture based on the ALF filter entity for the first partitioning element, and encoding the picture based on the ALF filter entity in the first partitioning element and the second partitioning element.

EXAMPLE 14

The method of example 13, wherein the first partitioning element and the second partitioning element comprise a first slice and a second slice, respectively.

EXAMPLE 15

The method of any of examples 13 and 14, wherein determining ALF filter entity in the second partitioning element comprises utilizing techniques similar to those for temporal ALF prediction between different pictures to determine the ALF filter entity in the second partitioning element.

EXAMPLE 16

A method of encoding video data, the method comprising determining whether temporal prediction of a set of filters for ALF is enabled based on a network abstraction layer (NAL) unit type and encoding a current picture based on the determination of whether temporal prediction of the set of filters for ALF is enabled.

EXAMPLE 17

The method of example 16, wherein determining whether temporal prediction of the set of filters for ALF is enabled based on the NAL unit type comprises determining whether temporal prediction of the set of filters for ALF is enabled based on the NAL unit type without determining a slice type.

EXAMPLE 18

The method of any of examples 16 and 17, wherein determining whether temporal prediction of the set of filters for ALF is enabled comprises one or more of determining that temporal prediction of ALF is available only for pictures that can reference to earlier decoded pictures, determining that temporal prediction of ALF is not available for pictures of intra random access picture (IRAP), instantaneous decoder refresh (IDR), or clean random access (CRA) types, determining that temporal prediction of ALF is not available for pictures that do not refer to any picture other than itself, and determining that temporal prediction of ALF is not available for random access pictures (RAP).

EXAMPLE 19

A method of encoding video data, the method comprising determining whether usage of stored filter for ALF is available based on temporal layer index of a current picture, wherein for a first picture having a lowest temporal index, determining whether usage of stored filter for ALF is available comprises determining that temporal ALF buffer is not available, and wherein for a second picture having a temporal index other than the lowest temporal index, determining whether usage of stored filter for ALF is available comprises determining that temporal ALF buffer is available.

EXAMPLE 20

A method of encoding video data, the method comprising determining one or more syntax elements that indicate whether usage of stored filter for ALF is available and signaling one or more syntax elements that indicate whether usage of stored filter for ALF is available.

EXAMPLE 21

The method of example 20, wherein signaling comprises signaling the one or more syntax elements at a picture, slice, or tile level.

EXAMPLE 22

The method of any of examples 20 and 21, wherein the one or more syntax elements are constrained by the network abstraction layer (NAL) unit type.

EXAMPLE 23

A method of encoding video data, the method comprising separate signaling syntax elements that control status of an ALF buffer.

EXAMPLE 24

A method comprising any combination of examples 13-23.

EXAMPLE 25

A device for decoding video data, the device comprising a memory for storing video data and a video decoder comprising at least one of fixed-function or programmable circuitry, wherein the video decoder is configured to perform the method of any of examples 1-12.

EXAMPLE 26

A device for decoding video data, the device comprising means for performing the method of any of examples 1-12.

EXAMPLE 27

A computer-readable storage medium having instructions stored thereon that when executed cause one or more processors of a device for video decoding to perform the method of any of examples 1-12.

EXAMPLE 28

A device for encoding video data, the device comprising a memory for storing video data and a video encoder comprising at least one of fixed-function or programmable circuitry, wherein the video encoder is configured to perform the method of any of examples 13-24.

EXAMPLE 29

A device for encoding video data, the device comprising means for performing the method of any of examples 13-24.

EXAMPLE 30

A computer-readable storage medium having instructions stored thereon that when executed cause one or more processors of a device for video encoding to perform the method of any of examples 13-24.

EXAMPLE 31

Any combination of techniques described in this disclosure.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   determining that temporal prediction for adaptive loop filter (ALF) is enabled for one or more intra coded slices of a picture, wherein determining that temporal prediction for ALF is enabled comprises determining that temporal prediction for ALF is enabled based on the picture having a temporal index value that is not equal to 0;
   determining ALF coefficients for one or more blocks of the one or more intra coded slices, for which the temporal prediction for ALF is enabled, based on ALF coefficients of a previously coded picture or slice; and
   applying the determined ALF coefficients to the one or more blocks to generate one or more filtered blocks.

2. The method of claim 1, wherein determining that temporal prediction for ALF is enabled further comprises determining that temporal prediction for ALF is enabled without determining a slice type of the one or more blocks.

3. The method of claim 1, wherein determining that temporal prediction for ALF is enabled further comprises determining that temporal prediction for ALF is enabled in the case that the picture is not one of intra random access picture (TRAP), random access picture (RAP), instantaneous decoder refresh (IDR), or clean random access (CRA) types.

4. The method of claim 1, wherein determining that temporal prediction for ALF is enabled further comprises determining that temporal prediction for ALF is enabled based on signaled information that is not signaled in a slice header.

5. The method of claim 1, wherein determining ALF coefficients for the one or more blocks based on ALF coefficients of the previously coded picture or slice comprises determining ALF coefficients of one or more blocks of an intra coded slice of the picture based on ALF coefficients of an inter coded slice of the picture.

6. The method of claim 1, wherein applying the determined ALF coefficients to the one or more blocks to generate one or more filtered blocks comprises applying the determined ALF coefficients, subsequent to a decoding process, to generate the one or more filtered blocks.

7. The method of claim 1, wherein applying the determined ALF coefficients to the one or more blocks to generate one or more filtered blocks comprises applying the determined ALF coefficients, subsequent to a reconstruction process in a video encoder, to generate the one or more filtered blocks.

8. A device for coding video data, the device comprising:
   memory configured to store ALF coefficients of a previously coded picture or slice; and
   processing circuitry coupled to the memory and configured to:
      determine that temporal prediction for adaptive loop filter (ALF) is enabled for one or more intra coded slices of a picture, wherein to determine that temporal prediction for ALF is enabled, the processing circuitry is configured to determine that temporal prediction for ALF is enabled based on the picture having a temporal index value that is not equal to 0;
      determine ALF coefficients for one or more blocks of the one or more intra coded slices, for which the temporal prediction for ALF is enabled, based on the ALF coefficients of the previously coded picture or slice stored in memory; and
      apply the determined ALF coefficients to the one or more blocks to generate one or more filtered blocks.

9. The device of claim 8, wherein to determine that temporal prediction for ALF is enabled, the processing circuitry is further configured to determine that temporal prediction for ALF is enabled without determining a slice type of the one or more blocks.

10. The device of claim 8, wherein to determine that temporal prediction for ALF is enabled, the processing circuitry is further configured to determine that temporal prediction for ALF is enabled in the case that the picture is not one of intra random access picture (IRAP), random access picture (RAP), instantaneous decoder refresh (IDR), or clean random access (CRA) types.

11. The device of claim 8, wherein to determine that temporal prediction for ALF is enabled, the processing circuitry is further configured to determine that temporal prediction for ALF is enabled based on signaled information that is not signaled in a slice header.

12. The device of claim 8, wherein to determine ALF coefficients for the one or more blocks based on ALF coefficients of the previously coded picture or slice, the processing circuitry is configured to determine ALF coefficients of one or more blocks of an intra coded slice of the picture based on ALF coefficients of an inter coded slice of the picture.

13. The device of claim 8, wherein to apply the determined ALF coefficients to the one or more blocks to generate one or more filtered blocks, the processing circuitry is configured to apply the determined ALF coefficients, subsequent to a decoding process, to generate the one or more filtered blocks.

14. The device of claim 8, wherein to apply the determined ALF coefficients to the one or more blocks to generate one or more filtered blocks, the processing circuitry is configured to apply the determined ALF coefficients, subsequent to a reconstruction process in a video encoder, to generate the one or more filtered blocks.

15. The device of claim 8, wherein the device comprises a wireless communication device.

16. A non-transitory computer-readable storage medium having instructions stored thereon that when executed cause one or more processors of a device for coding video data to:
determine that temporal prediction for adaptive loop filter (ALF) is enabled for one or more intra coded slices of a picture, wherein the instructions that cause the one or more processors to determine that temporal prediction for ALF is enabled comprise instructions that cause the one or more processors to determine that temporal prediction for ALF is enabled based on the picture having a temporal index value that is not equal to 0;
determine ALF coefficients for one or more blocks of the one or more intra coded slices, for which the temporal prediction for ALF is enabled, based on ALF coefficients of a previously coded picture or slice; and
apply the determined ALF coefficients to the one or more blocks to generate one or more filtered blocks.

17. The non-transitory computer-readable storage medium of claim 16, wherein the instructions that cause the one or more processors to determine that temporal prediction for ALF is enabled further comprise instructions that cause the one or more processors to determine that temporal prediction for ALF is enabled without determining a slice type of the one or more blocks.

18. The non-transitory computer-readable storage medium of claim 16, wherein the instructions that cause the one or more processors to determine that temporal prediction for ALF is enabled further comprise instructions that cause the one or more processors to determine that temporal prediction for ALF is enabled in the case that the picture is not one of intra random access picture (TRAP), random access picture (RAP), instantaneous decoder refresh (IDR), or clean random access (CRA) types.

19. The non-transitory computer-readable storage medium of claim 16, wherein the instructions that cause the one or more processors to determine that temporal prediction for ALF is enabled further comprise instructions that cause the one or more processors to determine that temporal prediction for ALF is enabled based on signaled information that is not signaled in a slice header.

20. The non-transitory computer-readable storage medium of claim 16, wherein the instructions that cause the one or more processors to determine ALF coefficients for the one or more blocks based on ALF coefficients of the previously coded picture or slice comprise instructions that cause the one or more processors to determine ALF coefficients of one or more blocks of an intra coded slice of the picture based on ALF coefficients of an inter coded slice of the picture.

21. The non-transitory computer-readable storage medium of claim 16, wherein the instructions that cause the one or more processors to apply the determined ALF coefficients to the one or more blocks to generate one or more filtered blocks comprise instructions that cause the one or more processors to apply the determined ALF coefficients, subsequent to a decoding process, to generate the one or more filtered blocks.

22. The non-transitory computer-readable storage medium of claim 16, wherein the instructions that cause the one or more processors to apply the determined ALF coefficients to the one or more blocks to generate one or more filtered blocks comprise instructions that cause the one or more processors to apply the determined ALF coefficients, subsequent to a reconstruction process in a video encoder, to generate the one or more filtered blocks.

23. A device for coding video data, the device comprising:
means for determining that temporal prediction for adaptive loop filter (ALF) is enabled for one or more intra coded slices of a picture, wherein the means for determining that temporal prediction for ALF is enabled comprises means for determining that temporal prediction for ALF is enabled based on the picture having a temporal index value that is not equal to 0;
means for determining ALF coefficients for one or more blocks of the one or more intra coded slices, for which the temporal prediction for ALF is enabled, based on ALF coefficients of a previously coded picture or slice; and
means for applying the determined ALF coefficients to the one or more blocks to generate one or more filtered blocks.

24. The device of claim 23, wherein the means for determining that temporal prediction for ALF is enabled further comprises means for determining that temporal prediction for ALF is enabled without determining a slice type of the one or more blocks.

25. The device of claim 23, wherein the means for determining that temporal prediction for ALF is enabled further comprises means for determining that temporal prediction for ALF is enabled in the case that the picture is not one of intra random access picture (IRAP), random access picture (RAP), instantaneous decoder refresh (IDR), or clean random access (CRA) types.

26. The device of claim 23, wherein the means for determining that temporal prediction for ALF is enabled further comprises means for determining that temporal prediction for ALF is enabled based on signaled information that is not signaled in a slice header.

27. A device for decoding video data, the device comprising:
memory configured to store ALF coefficients of a previously decoded picture or slice; and
processing circuitry coupled to the memory and configured to:
determine that temporal prediction for adaptive loop filter (ALF) is enabled for one or more intra decoded slices of a picture, wherein to determine that temporal prediction for ALF is enabled, the processing circuitry is configured to determine that temporal prediction for ALF is enabled without determining a slice type of the one or more blocks;
determine ALF coefficients for one or more blocks of the one or more intra decoded slices, for which the temporal prediction for ALF is enabled, based on the ALF coefficients of the previously decoded picture or slice stored in memory; and
apply the determined ALF coefficients to the one or more blocks to generate one or more filtered blocks.

* * * * *